(No Model.)
S. F. SHELBOURNE.
METHOD OF AND MEANS FOR LAYING SUBTERRANEAN CABLES.
No. 297,179. Patented Apr. 22, 1884.
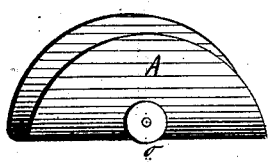
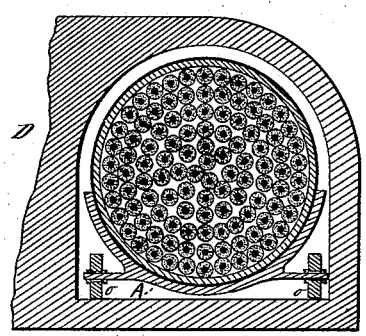
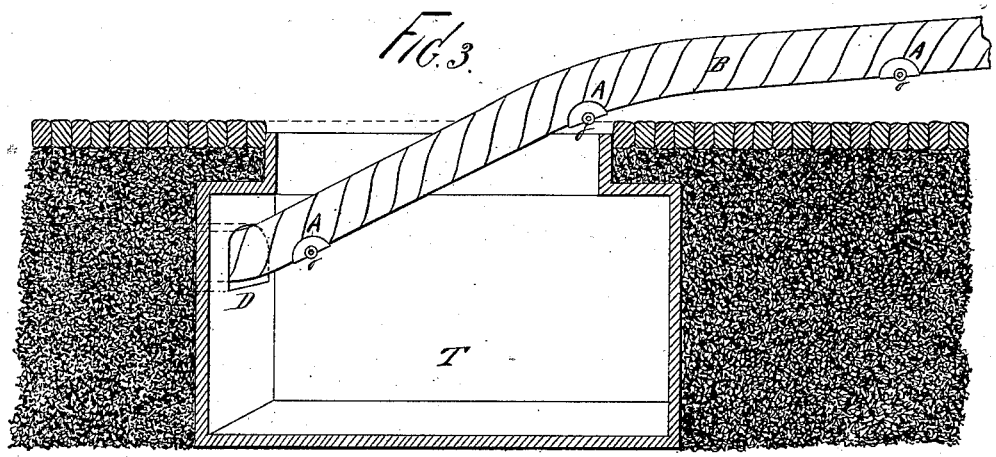

UNITED STATES PATENT OFFICE.

SIDNEY F. SHELBOURNE, OF NEW YORK, N. Y.

METHOD OF AND MEANS FOR LAYING SUBTERRANEAN CABLES.

SPECIFICATION forming part of Letters Patent No. 297,179, dated April 22, 1884.

Application filed August 18, 1883. (No model.)

*To all whom it may concern:*

Be it known that I, SIDNEY F. SHELBOURNE, a citizen of the United States, residing in the city of New York and State of New York, have invented a new and useful Method of and Means for Laying Subterranean Cables, of which the following is a specification.

My invention relates to that class of subterranean cables which are manufactured outside of and a distance from the trench in which they are to be laid and used, and therefore for which the tube or conduit is constructed and put under the pavement in advance of the arrival of the cable. In such cases these tubes or conduits are made to terminate at regular intervals varying from four hundred to one thousand feet in test or draw boxes of considerable size, also sunk below the pavements, and which are further continuously used when the cables are laid to connect or distribute the wires of the different cables which terminate into them. Under the conditions involved cables as thus laid have been usually of small size and containing fine wires, and are drawn in and out by a wire or cord of wires previously extended along the conduit, the cable, to promote as easy a passage as possible, being greased with tallow or lubricant sludge. Even in the cases of such small cables there is great danger that their wrappings will become injured and their insulation impaired by the considerable strain in dragging the cable and by abrasion in its contact with the rough walls of the tube or conduit. Economy of construction, effectiveness of insulation, and greatly-prolonged durability of underground conductors in cables are better secured by the use of larger and stronger wires, which give a very low resistance to the electric currents, and which are separated from each other by thick coatings of saturated insulation fiber, so as to lessen induction by the law of distance progression, and at the same time prevent the possibility, by accident or element, of a conductive contact between the wires of the cable. In order that such a construction of cable may be attained and the present system of drawing cables in and out of their conduits may be adhered to, the present invention presents a means of supporting the cable while being put in place within its conduit, and a conduit in form adapted to allow of such support in an effective and at the same time very inexpensive manner.

The cable, as shown in the drawings at B, Figure 3, may have a diameter from two and a half to five inches, or more.

At A, Fig. 1, is shown in perspective a curved scoop-like plate of thin metal, usually of iron, which may either be formed in a die or molded and cast in sand, with its trunnions formed on it in one piece. Upon these trunnions are placed small wheels or casters in such a position that the lowest curve of the metal plate is raised about one-eighth of an inch from the bottom of the tube or conduit. The size of the conduit with reference to the cable and its shape being made of a circular arch with flat bottom, as also the position of the truck A supporting the cable, are clearly shown in section in Fig. 2 of the drawings. The vertical height of the conduit need not in any case exceed by more than half an inch the span of its circular arch. This conduit is strongly and without joints made of Portland cement, which rapidly hardens under ground into a tough artificial stone. While one gallery only is shown in the drawings, any number may be joined with each other, as indicated by the broken line at D, Fig. 2.

Fig. 3 shows a draw or connection box, T, into which one end of the conduit D terminates. Into this conduit the cable B is shown to be entered. The small roller-trucks A A, having been protected from rust by previously dipping them in boiling coal-tar wax, which has cooled and hardened on them, are further served on their bearing-surfaces next to the cable with a light layer of hot pitch, and as the cable passes into the conduit they are stuck fast to its under side at distances of five feet or more along its length. It will be seen that as the cable continues to pass within the conduit its weight will rest upon the trucks carried along with it, and thus be preserved from injury by strain or abrasion by contact with the walls of the conduit. The trucks will remain permanently attached to the cable within the conduit for service, if ever in the course of time it will become necessary to withdraw the cable.

I do not confine myself to the particular form or character of truck shown, nor the particular method of attaching it to the cable; nor do I limit myself to any particular conformation of the conduit to receive the cable; but

What I claim as new, and desire to secure by Letters Patent, is—

1. The method of laying subterranean cables in conduits herein described, consisting in drawing into such conduits the cables at test or draw boxes placed beneath the pavement by means of a wire, draw-rope, chain, or rod extending through such conduit, and in fastening under such cables as they enter said conduits, at convenient intervals, a series of trucks or rollers, for the purpose of aiding the passage of the cable within the conduit and preventing its abrasion or injury against the walls of such conduit.

2. A truck or roller consisting of a curved semi-cylindrical plate of metal having small caster-wheels on bearings or trunnions fastened or cast upon the convex surfaces of such curved plates, for the purpose of supporting and easing the passage of subterranean cables within their conduits, substantially as described.

3. The combination of a subterranean cable with small trucks or rollers at spaced intervals attached to it, substantially as and for the purpose set forth.

4. The combination, with a subterranean cable, of trucks or rollers placed at intervals thereon, and the coating or layer of adhesive material on the cable-contact surfaces of said trucks, as and for the purpose set forth.

5. The combination of an arched and flat-bottomed conduit, a subterranean electric cable, and trucks or rollers for supporting the cable above the plane surface or floor of such conduit, for the purpose of preventing its injury or abrasion in passing along the conduit, substantially as described.

SIDNEY F. SHELBOURNE.

Witnesses:
FRANK S. TYLER,
GEO. L. WEED.